UNITED STATES PATENT OFFICE.

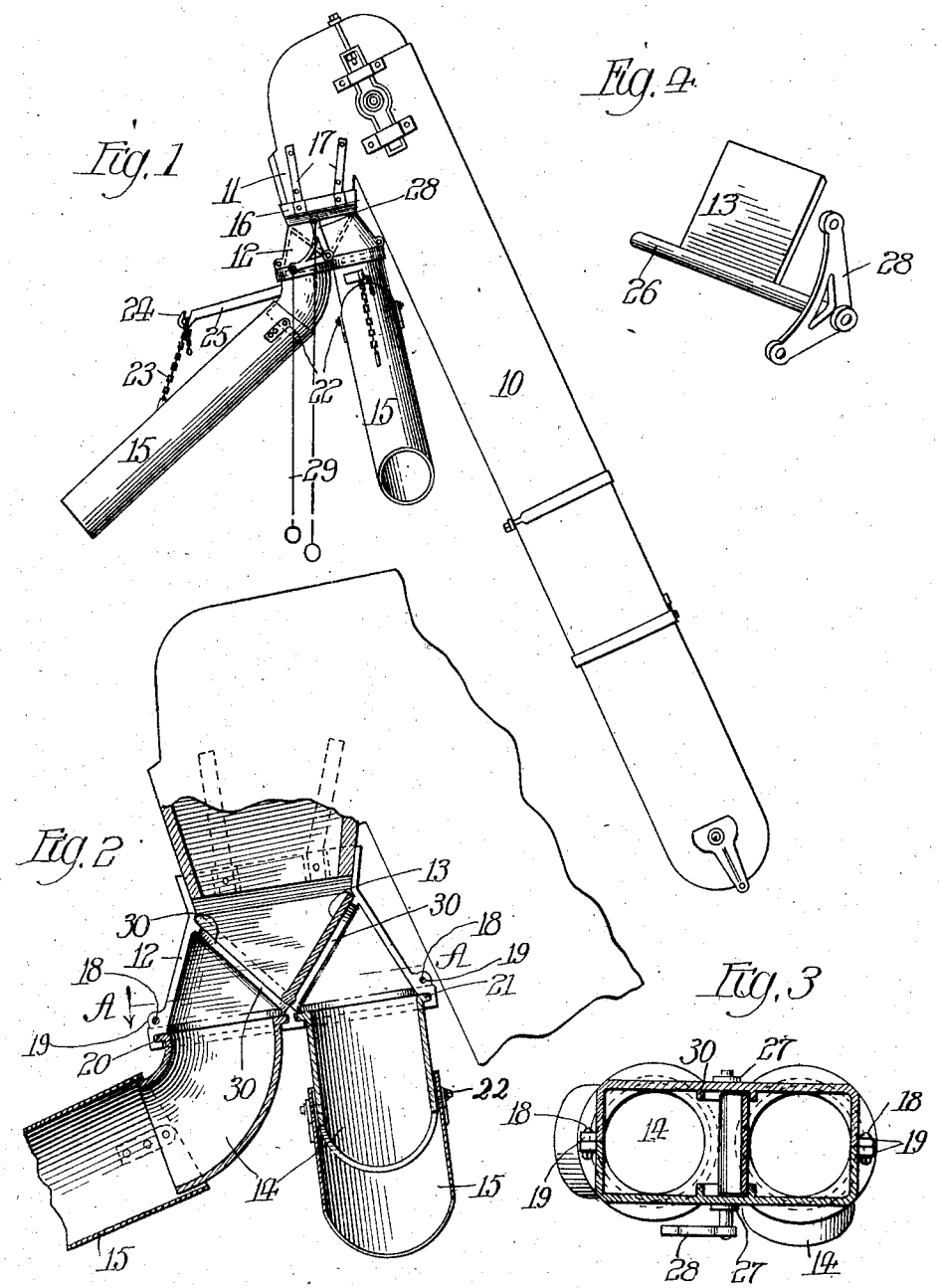

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

CONVEYING APPARATUS.

No. 878,721.        Specification of Letters Patent.        Patented Feb. 11, 1908.

Application filed April 12, 1907. Serial No. 367,846.

*To all whom it may concern:*

Be it known that I, JOHN H. GILMAN, a citizen of the United States, and resident of Ottawa, in the county of Lasalle and State of Illinois, have invented certain new and useful Improvements in Conveying Apparatus for Corn-Shellers, &c., of which the following is a full, clear, and exact specification.

My invention is concerned with certain novel improvements in conveying apparatus for corn shellers, etc., and more especially with the discharging mechanism by which the corn or other material can be delivered to any part of a wagon located on either side of the conveyer casing.

To illustrate my invention, I annex hereto a sheet of drawings, in which the same reference characters are used to designate identical parts in all the figures, of which,—

Figure 1 is a side elevation of a portion of a conveyer for a corn sheller, showing my intion applied thereto; Fig. 2 is a central vertical section through a portion of the same, on an enlarged scale; Fig. 3 is a top plan view in section on the line A—A of Fig. 2; and Fig. 4 is a perspective view of the valve removed.

My invention is concerned with the discharge spouts for the conveyer of a corn-sheller, the body of which is represented at 10. This body contains the customary belt and cups, or equivalent mechanism for elevating the shelled grain to the top thereof, when it is discharged into the proper shaped upper end 11, from which it falls into the valve casing 12, whence it is deflected by the valve 13 into one or the other of the elbows 14, which are provided with spouts 15, so that the corn can be discharged from either spout. The valve casing 12 is preferably made up of two symmetrical castings which have the upper portion 16 properly flaring to be secured to the lower end of the hopper portion 11, preferably by means of the straps 17. The bottom portions of the two castings, when brought together and secured, as by the bolts 18 passing through the lugs 19, form the two annular channels 20, in which the annular flanges 21 forming the upper ends of the elbows 14 are swiveled, so that they can be turned to direct the spouts at any angle desired. The spouts 15 are preferably pivoted, as at 22, to the elbows, and are provided with the chains 23 secured thereto, which coöperate with hooks 24 on the arms 25 secured to the elbows, so that the spouts can be adjusted to any desired vertical angle. By means of the above adjustment of the spouts, it will be obvious that the grain discharged through them can be directed toward any portion of a wagon arranged on either side of the body 10. The valve 13 is provided with the rock shaft portion 26, which is journaled in bearings 27 formed in the valve casing 12, and is provided on one end with the bell crank arm 28, which has the ropes 29 secured thereto, so that it can be manipulated from the ground. The valve casing 12 is provided with the two oppositely disposed valve seats 30 formed by flanges cast upon the interior of the valve casing.

The operation of my improved apparatus will be apparent without any further description, and it is evident that it may be modified in details of construction, so that I do not desire to be limited in the interpretation of the following claims except as may be necessitated by the state of the prior art.

What I claim as new, and desire to secure by Letters Patent of the United States, is,—

1. In a grain-discharging apparatus, the combination with the valve casing, of the pair of elbows fitted to the bottom of said casing, connections between the valve casing and each of the elbows permitting the latter to rotate on the casing independently of each other, and the single valve pivoted in the casing and movable to one position or another to deflect the grain into one or the other of the elbows.

2. In a grain-discharging apparatus, the combination with the valve casing, of the pair of elbows fitted to the bottom of said casing, connections between the valve casing and the elbows permitting the latter to rotate on the casing, the valve pivoted in the casing to deflect the grain into one or the other of the elbows, the spouts pivoted to the bottoms of the elbows, and means for holding the spouts at any angle to which they may be swung.

3. In a grain-discharging apparatus, the combination with the valve casing having the pair of annular grooves in the bottom thereof, of the flanged elbows fitted to turn in said grooves, and the valve pivoted in the casing to deflect the grain into one or the other of the elbows.

4. In a grain-discharging apparatus, the combination with the valve casing having the pair of annular grooves in the bottom thereof, of the flanged elbows fitted to turn in said grooves, the valve pivoted in the casing to deflect the grain into one or the other of the elbows, the spouts pivoted to the elbows, and means for holding the spouts at any angle to which they may be swung.

5. In a grain-discharging apparatus, the combination with the valve casing made up of the two symmetrical sections which when assembled form the pair of annular grooves in the bottom thereof, and means for securing the sections together, of the flanged elbows fitted to turn in said grooves, the valve pivoted in the casing to deflect the grain into one or the other of the elbows, and the spouts carried by the elbows.

6. In a grain-discharging apparatus, the combination with the valve casing made up of the two symmetrical sections which when secured together form the pair of annular grooves in the bottom thereof and have the ribs on the inside thereof forming the valve seats, and means for securing the sections together, of the flanged elbows fitted to turn in said grooves, the valve pivoted in the casing to deflect the grain into one or the other of the elbows, and the spouts secured to the bottoms of the elbows.

In witness whereof, I have hereunto set my hand and affixed my seal, this 5th day of April, A. D. 1907.

JOHN H. GILMAN. [L. S.]

Witnesses:
 ED R. CLAUS,
 LOUIS LEDRICK.